(12) United States Patent
Ueda et al.

(10) Patent No.: US 8,133,117 B2
(45) Date of Patent: Mar. 13, 2012

(54) GAME APPARATUS, GAME MESSAGE DISPLAYING METHOD AND STORAGE MEDIUM STORING GAME PROGRAM

(75) Inventors: Kenshiro Ueda, Kyoto (JP); Kenichi Nishi, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 1917 days.

(21) Appl. No.: 10/771,309

(22) Filed: Feb. 5, 2004

(65) Prior Publication Data

US 2004/0157661 A1    Aug. 12, 2004

(30) Foreign Application Priority Data

Feb. 12, 2003 (JP) .................................. 2003-33176

(51) Int. Cl.
*G06F 19/00* (2011.01)
(52) U.S. Cl. ........................................................ 463/35
(58) Field of Classification Search .............. 463/30–35, 463/43, 44
See application file for complete search history.

(56) References Cited

U.S. PATENT DOCUMENTS

| 6,572,475 B1 * | 6/2003 | Okabe et al. ..................... 463/30 |
| 6,579,183 B1 * | 6/2003 | Hiromi et al. .................... 463/30 |
| 7,027,600 B1 * | 4/2006 | Kaji et al. ........................ 381/17 |
| 2001/0041619 A1 * | 11/2001 | Sakagami et al. ............... 463/43 |
| 2002/0177481 A1 * | 11/2002 | Kitsutaka ......................... 463/30 |
| 2003/0130037 A1 * | 7/2003 | Sugimori et al. ................ 463/37 |

FOREIGN PATENT DOCUMENTS

| JP | 7-213743 | 8/1995 |
| JP | 10-165645 | 6/1998 |
| JP | 2001-351125 | 12/2001 |
| JP | 2003-164669 | 6/2003 |
| JP | 2004-089475 | 3/2004 |

* cited by examiner

*Primary Examiner* — Dmitry Suhol
*Assistant Examiner* — Malina K Rustemeyer
(74) *Attorney, Agent, or Firm* — Nixon & Vanderhye PC

(57) ABSTRACT

A game apparatus includes a CPU, and in the game apparatus, letters are displayed as visual support for a sound generated by a message generating object. When a game message is displayed, a distance between the message generating object and a player object is calculated. Then, a form of the letters to be displayed on a billboard is changed depending upon the calculated distance. The form to be changed is, for example, transparency and a size of the letters. Thus, a game image in which the form of the letters is changed depending upon the distance between the player object and the message generating object is displayed.

20 Claims, 9 Drawing Sheets

(A)

(B)

GAME APPARATUS, GAME MESSAGE DISPLAYING METHOD AND STORAGE MEDIUM STORING GAME PROGRAM

This application claims priority to Japanese Application No. 2003-033176 filed Feb. 12, 2003, the entire contents of which are hereby incorporated by reference.

BACKGROUND OF THE INVENTION

1. Field of the Invention

The present invention relates to a game apparatus, a game message displaying method and a storage medium storing a game program. More specifically, the present invention relates to a game apparatus which displays letters as visual support for a sound generated by a message generating object on a billboard in a role playing game existing in a virtual three-dimensional space, as well as a game message displaying method and a storage medium storing a game program that performs the game message displaying method.

2. Description of the Prior Art

Conventionally, in a video game, when a player character (player object) operated by a player moves closer to a sound generating object which is defined as something that generates a sound during a game, the sound becomes louder, and when the player object is farther away from the sound generating object, the sound becomes quieter. Specifically, in a recent video game in which the program is created by use of a virtual three-dimensional coordinate, volume of a sound is controlled based upon a distance between the player object and the sound generating object, thereby enhancing realism. Furthermore, in Japanese Patent No. 3123957, for example, a reflected sound is changed depending upon a distance between a moving body and an object which generates the reflected sound, thereby also comprising realism.

On the other hand, in some games, in a scene in which non-player objects have a conversation with each other, generation of a pseudo sound makes it possible to pretend to have a conversation between them.

However, in the above-described game involving pseudo sound, even if the player object moves closer to the sound generating object, the sound merely becomes louder, for example, and therefore, the player cannot know contents and a meaning of the conversation or a message. Thus, it is possible to provide a visual support means for displaying the content of the message. However, merely displaying letters on a conversation displaying window or the like may mar the valuable realism intended to be created by a three-dimensional game image and the control of the sound.

SUMMARY OF THE INVENTION

Therefore, it is a primary object of the present invention to provide a novel game apparatus, a game message displaying method and a storage medium storing the program thereof.

Another object of the present invention is to provide a game apparatus, a game message displaying method and a storage medium storing a program thereof capable of improving realism.

The other object of the present invention is to provide a game apparatus, a game message displaying method and a storage medium storing a program thereof capable of improving strategies and interest of a game.

A game apparatus according to a preferred embodiment of the present invention displays letters as visual support for a sound generated by a message generating object using a virtual billboard. The game apparatus is provided with a distance calculating means and a form changing means. The distance calculating means calculates a distance between the message generating object and a player object, and the form changing means changes the form of the letters displayed on the billboard depending upon the distance calculated by the distance calculating means.

More specifically, the game apparatus (10) displays the letters on a billboard as the visual support for the sound generated by the message generating object (84, 88). When displaying the game message in the game apparatus, the distance calculating means (36, 70*d*, S7, S21-S27) calculates a distance between the message generating object and the player object (82). Then, the form changing means (36, 70*e*, S9, S31-S35, S41-S45) changes the form (86, 90) of the letters displayed on the billboard depending upon the distance calculated by the distance calculating means. Thus, according to the present invention, the form of the displayed letters is changed depending upon the virtual distance between the player object and the message generating object, thereby enhancing realism.

In one embodiment, the form changed by the form changing means is the transparency of the letters. Accordingly, the lightness and darkness of the letters to be displayed is changed depending upon the distance between the player object and the message generating object. This makes it possible to intuitively determine how far the player object is from the message generating object, thereby improving realism for the game. Furthermore, using the invention, it is possible to enhance stage effects at the time of appearance of the message generating object and thus improve strategies and interest in a game.

More specifically, the form changing means increases the transparency of the letters in proportion to the distance calculated by the distance calculating means. Accordingly, when the lightness and darkness of a message display is changed depending upon the distance between the player object and the message generating object, the letters to be displayed become light in color with increasing distance from the message generating object, and therefore, it is possible to intuitively determine how far the player object is from the message generating object.

In still another embodiment, the form to be changed by the form changing means is the size of the letters. Accordingly, the size of the letters to be displayed is made larger or smaller depending upon the distance between the player object and the message generating object, and therefore, it is possible to intuitively determine how far the player object is from the message generating object, thereby enhancing realism and improving strategies and interest in the game.

In yet another embodiment, the form changing means changes the form of the letters such that a relationship between the form of the letters and the distance is different from a relationship between the sound and the distance. Accordingly, perspectives based on characteristics or roles which are different between the sound and the letters can be represented, thereby enhancing realism and interest in the game.

More specifically, in the relationship between the form of the letters and the distance, a threshold value of the distance for generating the letters is set to be different from a threshold value of the distance for generating the sound. Accordingly, the letters are displayed at a timing different from that of an output of the sound, and therefore, perspectives based on characteristics or roles which are different between the sound and the letters can be represented.

A game message displaying method according to a preferred embodiment of the present invention is a method for displaying a game message using a billboard in the game apparatus which displays letters as visual support for a sound generated by the message generating object. The game message displaying method includes a distance calculating step and a form changing step. The distance calculating step calculates the distance between the message generating object and a player object. The form changing step changes a form of the letters to be displayed on the billboard depending upon the distance calculated in the distance calculating step.

A storage medium storing a game message displaying program according to the present invention is a storage medium storing a program for displaying a game message on a billboard in the game apparatus which displays letters as visual support for a sound generated by a message generating object. The game message displaying program of the storage medium makes a processor of the game apparatus execute a distance calculating step and a form changing step. The distance calculating step calculates a distance between the message generating object and a player object. The form changing step changes a form of the letters to be displayed on the billboard depending upon the distance calculated by the distance calculating step.

The game message displaying method and the storage medium storing the game message displaying program enhance realism and further improve strategies and interest in a game.

According to the present invention, the form of the letters to be displayed is changed depending upon the distance between the player object and the message generating object, and therefore, it is possible to further enhance realism created by a three-dimension game image, sound and the like. In addition, stage effects at a time of appearance of the message generating object is enhanced, and therefore, it is possible to improve strategies and interest in a game.

The above described objects and other objects, features, aspects and advantages of the present invention will become more apparent from the following detailed description of the preferred embodiment of the present invention when taken in conjunction with the accompanying drawings.

DETAILED DESCRIPTION OF THE PREFERRED EMBODIMENTS

Figure 1:
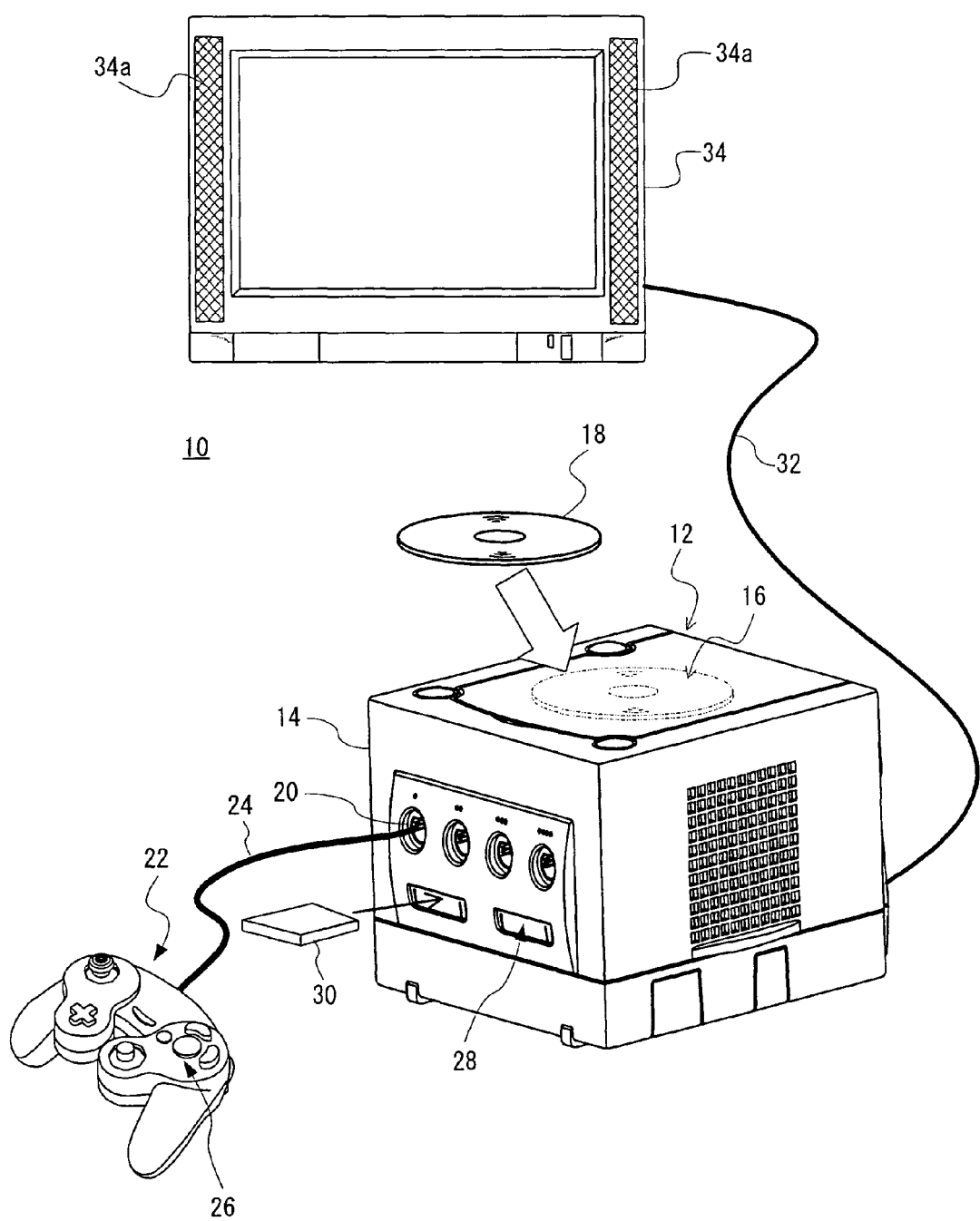
FIG. 1 is an illustrative view showing an exterior of a game system of one embodiment of the present invention.

A video game system 10 of the embodiment shown in FIG. 1 includes a video game apparatus or a video game machine (hereinafter merely referred to as "game machine") 12. The game machine 12 is supplied with a power source, and the power source may be a general AC adapter (not shown) in this embodiment. The AC adapter is inserted to a standard wall socket for home use, and a power source for home use is converted into a low DC voltage signal suitable for driving the game machine 12. In another embodiment, a battery may be utilized as the power source.

The game machine 12 of this embodiment includes an approximately cubic housing 14, and the housing 14 is provided with an optical disk drive 16 on an upper side thereof. An optical disk 18, which is only one example of an information storage medium storing a game program, is loaded in the optical disk drive 16. The housing 14 is provided with a plurality of connectors 20 (four, in this embodiment) on a front surface thereof. These connectors 20 are for connecting a controller 22 to the game machine 12 by a cable 24 and can connect up to four controllers to the game machine 12 in this embodiment.

The controller 22 is provided with an operating means (control) 26 on upper, lower, lateral sides and etc. thereof. The operating means 26 includes, for example, two analog joysticks, one cross key, a plurality of button switches and so on. One analog joystick is utilized for inputting a moving direction and/or a moving speed, a moving amount and etc. of a player character (moving image character operable by use of the controller 22 by the player) according to an amount and a direction of an inclination of the stick. The other analog joystick is utilized for controlling movement of a virtual camera, for example, according to a direction of an inclination thereof. The cross switch is utilized for instructing the moving direction of the player character in place of the analog joystick. The button switches are utilized for instructing movement of the player character, switching a point of view of the virtual camera in a three-dimensional image, adjusting the moving speed of the player character and so on. The button switches further control, for example, a menu selection and movement of a pointer or a cursor.

It is noted that the controller 22 is connected to the game machine 12 by a cable 24 in this embodiment. However, the controller 22 may be connected to the game machine 12 by another method such as in a wireless manner via an electromagnetic wave (e.g., radio wave or infrared ray). Furthermore, detailed structure of the operating means 26 of the controller 22 is, of course, not limited to the structure of this embodiment and can be arbitrarily changed or modified. For example, only one analog joystick may be utilized or no analog joystick may be utilized. In addition, the cross switch may not be utilized.

At least one (two, in this embodiment) memory slot 28 is provided below the connectors 20 on the front surface of the housing 14 of the game machine 12. A memory card 30 is inserted to this memory slot 28. The memory card 30 is utilized for loading the game program, the data and etc. read from the optical disk 18 so as to temporarily store, or saving (storing) game data (e.g., result of a game) of the game that the player plays by utilizing the game system 10.

The housing 14 of the game machine 12 is, on a rear surface thereof, provided with an AV cable connector (not shown) with which a monitor 34 is connected to the game machine 12 through an AV cable 32. The monitor 34 is typically a color television receiver, and the AV cable 32 inputs a video signal from the game machine 12 to a video input terminal of the color television and applies a sound signal to a sound input terminal. Accordingly, a game image of a three-dimensional (3D) video game, for example, is displayed on a screen of the color television (monitor) 34, and a game sound (e.g., stereo) such as a game music, a sound effect and etc. is output from right and left speakers 34a.

In the game system 10, a user or a game player turns on a power source of the game machine 12 in order to play a game (or another application), and then, selects a suitable optical disk 18 storing a video game (or another application intended to play), and loads the optical disk 18 on the disk drive 16 of the game machine 12. In response thereto, the game machine 12 starts to execute the video game or another application on the basis of software stored in the optical disk 18. The user operates the controller 22 so as to apply an input to the game machine 12. For example, by operating any one of the operating means 26, the game or another application is started. By moving another of the operating means 26, it is possible to move the player character (player object) toward a different direction and to change the point of eye of the user (camera location) in the three-dimensional (3D) game world.

Figure 2:
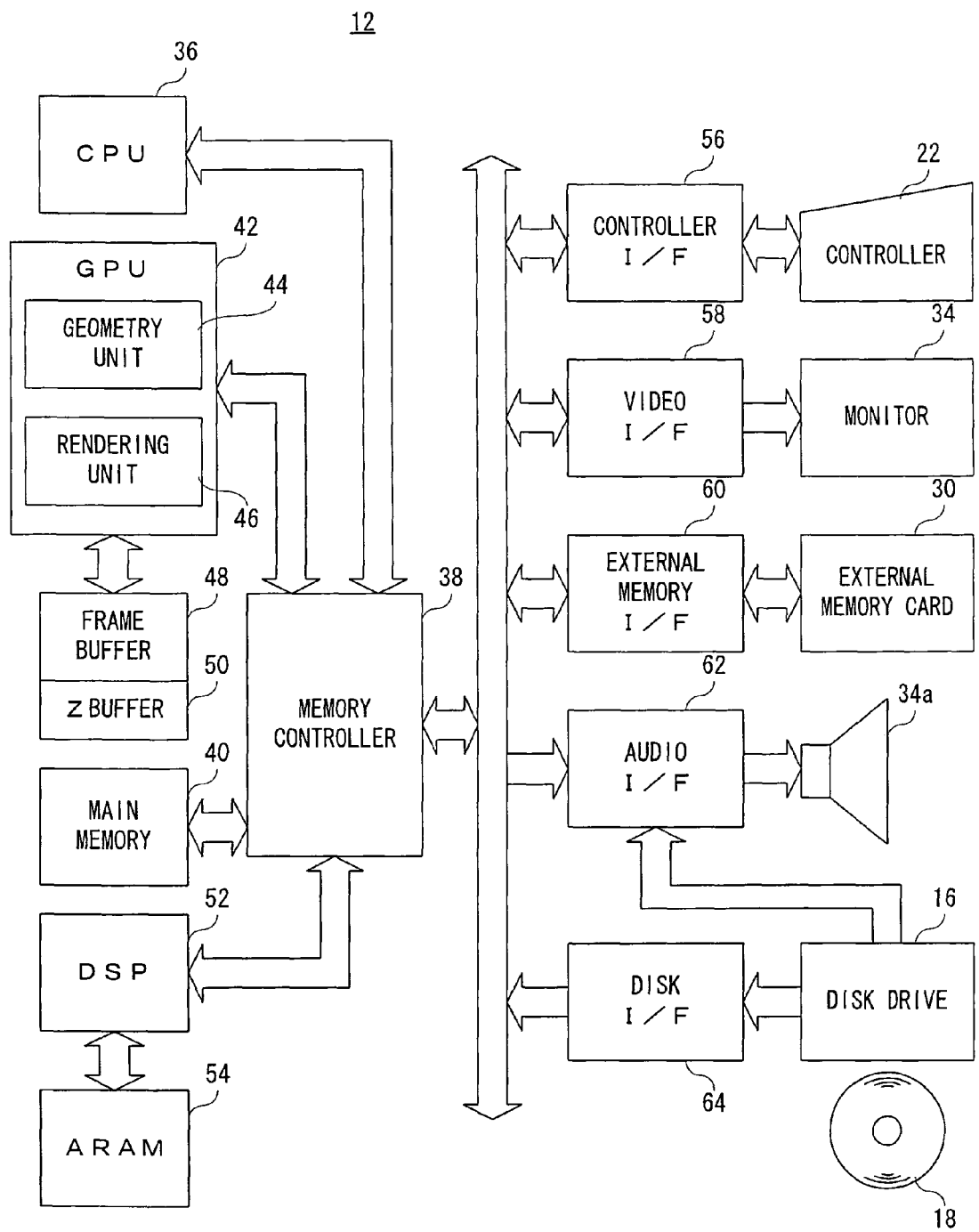
FIG. 2 is a block diagram showing one example of an internal structure of a game machine of FIG. 1 embodiment.

FIG. 2 is a block diagram showing an electrical internal structure of the video game system 10 of FIG. 1 embodiment. The game machine 12 is provided with a central processing unit (hereinafter, may be referred to as "CPU") 36. The CPU 36 is also called a computer or a processor and is in charge of the overall control of the game machine. The CPU 36 or computer functions as a game processor and is connected with a memory controller 38 via a bus. The memory controller 38 mainly controls writing and reading of a main memory 40 connected via a bus under control of the CPU 36. The main memory 40 is utilized as a work area or a buffer area. The memory controller 38 is coupled with a GPU (Graphics Processing Unit) 42.

The GPU 42 forms a part of a rendering means, and is constructed by, for example, a single chip ASIC, that receives a graphics command from the CPU 36 via the memory controller 38 and then, generates, in response to the command, the three-dimensional (3D) game image by a geometry unit 44 and a rendering unit 46. That is, the geometry unit 44 performs a coordinate operation process such as turn-around or rotation, movement, transformation and etc. of a variety of characters and objects (which is formed by a plurality of polygons, and the polygon is a polygonal plane defined by at least three vertex coordinates) in a three-dimensional coordinates system. The rendering unit 46 performs a rendering process such as a texture mapping to paste a texture (pattern image) on each of polygons of a billboard described later or a variety of objects. Accordingly, three-dimensional image data to be displayed on the game screen is produced from a three-dimensional model by the GPU 42, and the image data is rendered (stored) in a frame buffer 48.

It is noted that data (primitive or polygon, texture and etc.) required for executing the graphics command by the GPU 42 is acquired from the main memory 40 via the memory controller 38.

The frame buffer 48 is a memory for rendering (accumulating) one frame of the image data of the raster scan monitor 34, for example, and is rewritten by the GPU 42 at every frame. A video I/F 58 described later reads the data stored in the frame buffer 48 through the memory controller 38, whereby a game image can be displayed on the screen of the monitor 34. It is noted that a capacity of the frame buffer 48 is a size corresponding to the number of pixels (or dots) of a screen intended to be displayed, has, for example, the number of pixels (storing position or address) of the display or the monitor 34.

Furthermore, a Z buffer 50 has a storage capacity equal to "the number of pixels (storing position or address) corresponding to the frame buffer 48×the number of bits of depth data per one pixel", and stores depth information or depth data (Z value) of dots corresponding to respective storing positions of the frame buffer 48.

It is noted that both the frame buffer 48 and the Z buffer 50 may reside in a portion of the main memory 40.

The memory controller 38 is also connected to a sub-memory (ARAM) 54 via a DSP (Digital Signal Processor) 52. Accordingly, the memory controller 38 controls writing and/or reading of the ARAM 54 in addition to the main memory 40 under the control of the CPU 36.

The DSP 52 functions as sound processor, for example and executes an audio processing task. The ARAM 54 can be utilized as an audio memory for storing sound wave-form data (sound data) read from the disk 18. The DSP 52 receives an audio processing command from the CPU 36 via the memory controller 38 and extracts necessary sound wave-form data according to the command so as to perform a process such as a pitch modulation, mixing the sound data and effect data (mix). The audio processing command is generated by sequentially reading and analyzing playing control data (sound data) written to the main memory 40 by execution of the sound processing program and etc. The sound wave-form data is sequentially read and processed so as to generate a game audio content by the DSP 52. Content or audio output data thus generated is buffered in the main memory 40 and etc. and then transmitted to an audio I/F 62 so as to be output from the speakers 34a as a stereo sound. Accordingly, a sound is output from the speakers 34a.

It is noted that the audio data to be generated is not limited to the audio data for 2ch stereo reproduction and is adaptable to surround reproduction such as 5.1ch, 6.1ch, 7.1ch and etc. or monophonic reproduction.

The memory controller 38 is further connected with respective interfaces (I/F) 56, 58, 60, 62 and 64 by buses.

The controller I/F 56 is an interface for the controller 22 and applies an operation signal or data of the operating means 26 of the controller 22 to the CPU 36 through the memory controller 38.

The video I/F 58 accesses the frame buffer 48 so as to read the image data created by the GPU 42 and applies the image signal or the image data (digital RGB pixel value) to the monitor 34 via the AV cable 32 (FIG. 1).

The external memory I/F 60 couples the memory card 30 (FIG. 1) to be inserted on the front surface of the game machine 12 with the memory controller 38. This allows the CPU 36 to write and read data to and from the memory card 30 via the memory controller 38.

The audio I/F 62 receives the audio data applied from the buffer through the memory controller 38 or an audio stream read from the optical disk 18 and applies an audio signal (sound signal) corresponding thereto to the speakers 34a of the monitor 34.

It is noted that in a case of the stereo sound, the speaker 34a is provided on the right and left. Furthermore, in a case of the surround reproduction, another five speakers and one speaker for low sound (for 7.1ch) may be provided via an AV amplifier and etc. in addition to the speakers 34a for the monitor 34.

Then, the disk I/F 64 connects the disk drive 16 with the memory controller 38, and whereby, the CPU 36 controls the disk drive 16. Program data, object data, texture data, sound data and etc. read from the optical disk 18 by the disk drive 16 are written to the main memory 40 under the control of the CPU 36.

Figure 3:
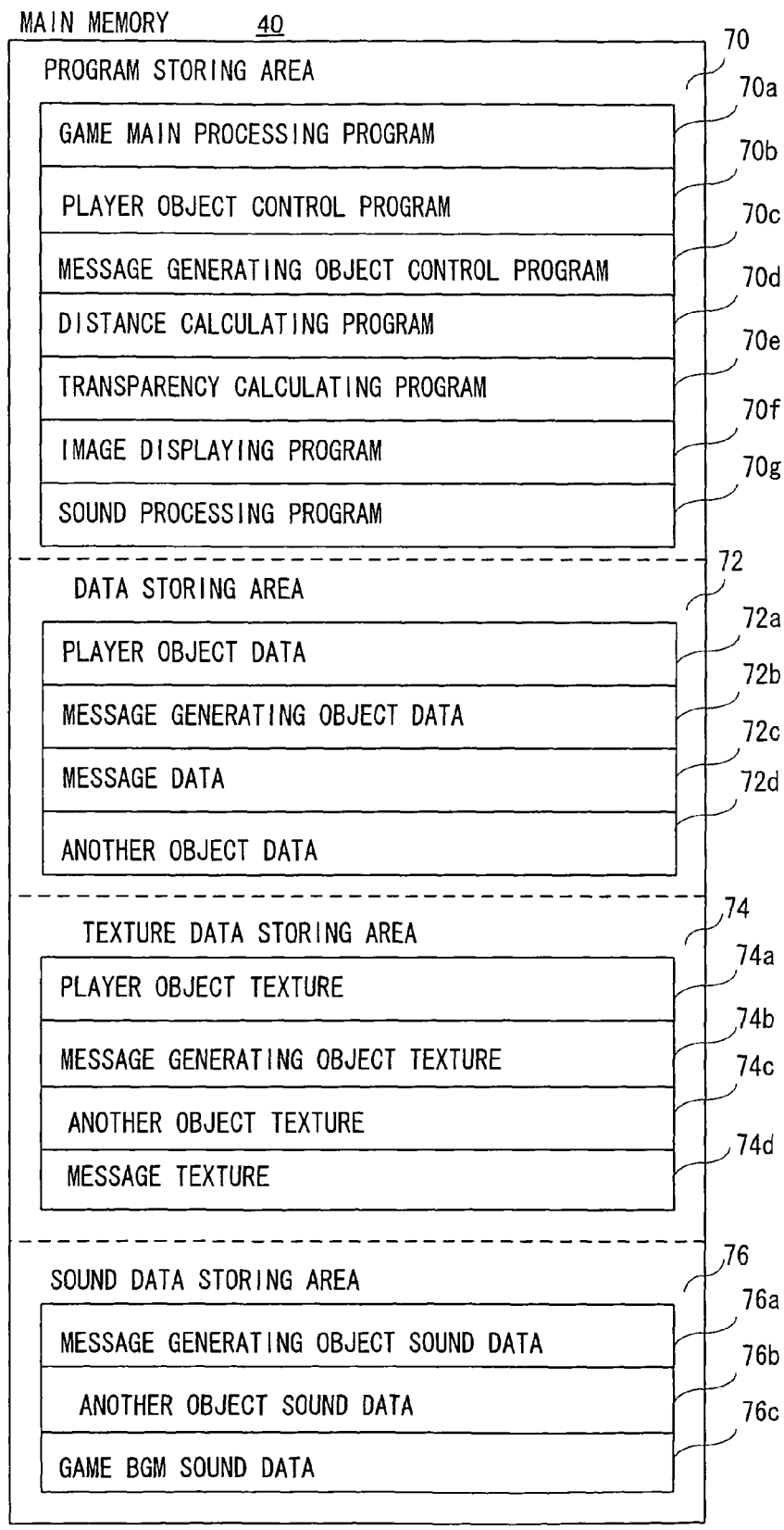
FIG. 3 is an illustrative view showing one example of a memory map of a main memory in FIG. 2.

FIG. 3 shows a memory map of the main memory 40. The main memory 40 includes a game program storing area 70, a data storing area 72, a texture data storing area 74 and a sound data storing area 76.

Into the game program storing area 70, the game program read from the optical disk 18 is stored entirely at one time or partially and sequentially. The CPU 36 executes a game process according to the game program. The game program includes a game main processing program 70a, a player object control program 70b, a message generating object control program 70c, a distance calculating program 70d, a transparency calculating program 70e, an image displaying program 70f, and a sound processing program 70g and etc. in this embodiment. It is noted that although not illustrated, another various programs required for progress of the game are also stored.

The player object control program 70b is for controlling a position, a state and etc. of the player object in response to the operation signal and the like. The player object is a character who can be moved or takes another arbitrary movement in a game space by operating the controller 22 by the game player. The message generating object control program 70c is for controlling a position, a state and etc. of a message generating object. The message generating object generates a message by use of a sound and letters with respect to the game player. Then, the distance calculating program 70d is for calculating a distance between the player object and the message generating object. Furthermore, the transparency calculating program 70e is for calculating or determining transparency (α value) of the letters (or the texture of the letters) as a displaying form determining program of the letters (message). In another embodiment, this may be a program for calculating or determining a size (enlarged/reduced ratio) of the letters. Furthermore, the image displaying program 70f is for generating 3D image data and displaying the same on the monitor 34, and the sound processing program 70g is for processing the sound data and outputting a sound such as a game music and etc. from the speakers 34a.

In the data storing area 72, player object relating data 72a, message generating object relating data 72b, message data 72c, another object relating data 72d and etc are stored. Each data includes information of a position coordinate, a state and etc. It is noted that each object is formed by a polygon.

The message data 72c is data relating to the message generated by the message generating object, and includes, for example, numbers for specifying the texture and the sound data of the message (letters and sound) previously set depending upon a scene or a situation. As another object, a non-player object (character that cannot be controlled or operated by the game player), a background object and a billboard are included.

The billboard is called a billboard method in a three-dimensional computer graphics and means a plate-shaped transparent polygon having four apexes. The billboard moves depending upon changes of a viewpoint of a camera, is set so as to be directed to the camera at all times (such that a direction of a normal is coincident with a direction of the gaze) and is pasted with a texture. According to the method of the billboard, a texture depicted with an object located in a distant view, for example, is previously prepared, and by pasting the texture on the billboard, the object of the distant view or the like is depicted and therefore, there is no need to perform a complicated polygon process. Accordingly, there are advantages of decreasing an amount of information and of increasing a processing speed with the rendering load decreased. Then, as described later, the billboard is pasted with a texture of a message (letters) generated by the message generating object, and therefore, the display screen is displayed with the message comprising letters.

In the texture data storing area 74, player object texture data 74a, message generating object texture data 74b, another object texture data 74c, message texture data 74d and etc. are stored. The another object texture data 74c includes the texture and etc. previously depicted with the object located in the distant view, for example. Furthermore, the message texture 74d includes texture data each of which is corresponding to messages generated by the message generating object and stores textures by a sentence unit forming a message or by a letters unit forming a message sentence. The texture data can set the α value (transparency or opacity) in addition to each of values of RGB at every pixel.

In the sound data storing area 76, sound data relating to a sound (message) generated by the message generating object 76a, sound data relating to a sound generated by another object 76b, sound data relating to a game BGM 76c, and etc. are stored.

The message generating object sound data 76a includes sound data each of which corresponds to a message generated by the message generating object. The message relating sound data 76a is preferably for accurately representing the message as it is. That is, if a message is "this is a weather forecast at noon", for example, it is preferable a sound literally indicative of "this is a weather forecast at noon" is output. However, in some cases, a pseudo sound may be reproduced. Alternatively, a specific sound corresponding to the message may be reproduced. That is, in a case of a message which does not exert a great influence on progress of the game, a sound for less important message may be output while in a case of an important message which exerts great influence upon the progress of the game, a sound for more important message may be output.

It is noted that into the data storing area 72, the texture data storing area 74 and the sound data storing area 76 of the main memory 40, the data such as each object data, each message data, each texture data, each sound data and etc. described above are loaded from the optical disk 18 entirely at a time or partially and sequentially as necessary.

Furthermore, although not shown in FIG. 3, storing areas for various data, flags and etc. required to progress the game are also provided. For example, an after-mentioned renewed position/state data of each object, texture data of a message in which the α value is renewed, and etc. are stored.

In the game system 10, in a case the message generating object is present on the display screen, or even if it is not displayed on the display screen and in a case a distance between the player object and the message generating object is equal to or less than a predetermined value in the map or a stage in a three-dimensional game space, a message by a sound is output from the message generating object and a message by letters are further displayed on the display screen. The message by the sound is visually supported by the character. Then, a form of the message by the character is changed depending upon the distance between the player object and the message generating object.

Figure 4:
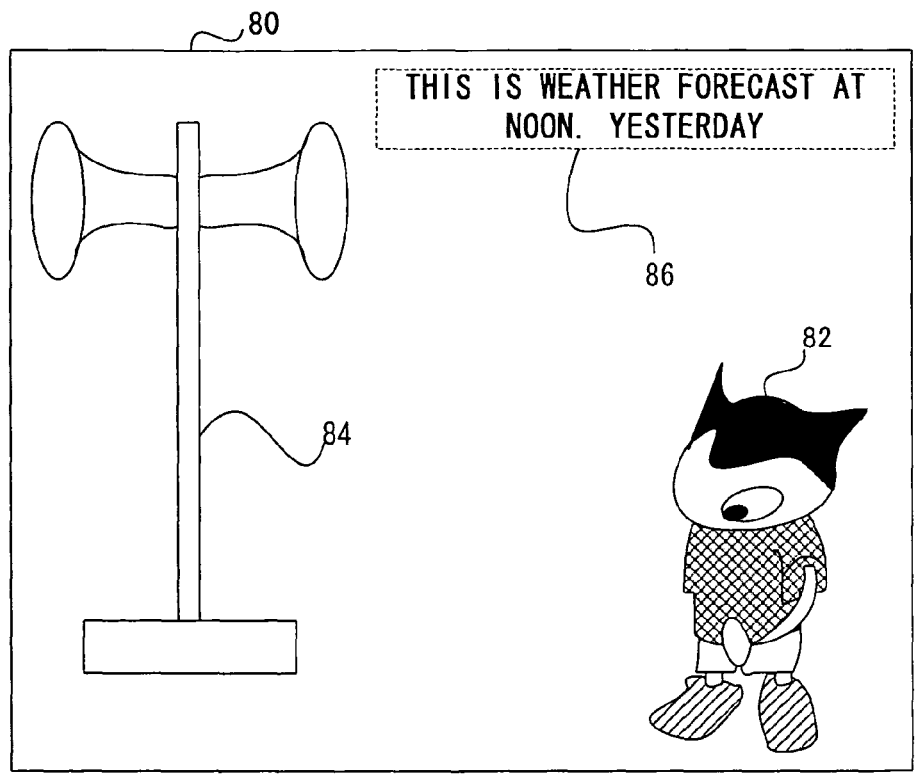
FIG. 4 (A) illustrates one example of a display screen of the invention when a player object and a message generating object are close to each other, and FIG. 4 (B) illustrates another example of a display screen in a case when the player object and the message generating object are far from each other.
Figure 4:
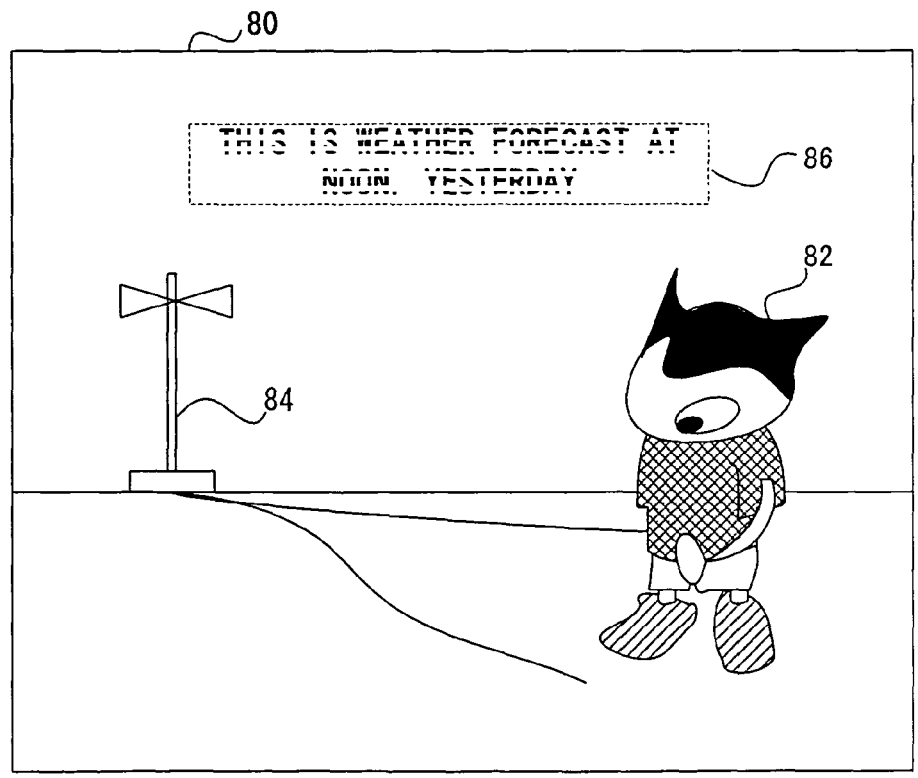

More specifically, FIG. 4 shows a state in which the message displaying form by the letters is changed. A player object 82 and one message object 84 are present on a display screen 80. The message generating object 84 takes, as one example, a radio tower (speaker) from which information in an area, programs from a radio broadcasting station and etc. are broadcasted is set in a park of the area. The weather forecast is broadcasted in this case, and a message indicative of "This is a weather forecast at noon. Yesterday" is scroll-displayed on the display screen 80 by the letters.

According to FIG. 4 (A), the player object 82 and the message generating object 84 are close to each other and have a short distance between them, and therefore, the texture of the letters 86 is set to be low in transparency (i.e., opaque side), and the letters of the message is displayed darkly and opaquely. At this time, a volume of the sound of the message is also set to a high level. It is noted that although the texture of the letters 86 is enclosed by dotted lines in the interests of simplicity in FIG. 4, the dotted line need not to be displayed on the actual display screen 80.

On the other hand, in a case the player subsequently moves the player object far from the message generating object 84 by operating the controller 22, the player object 82 and the message generating object are far from each other as shown in FIG. 4 (A) and has a long distance between them, and therefore, the texture of the letters 86 is set to be high in transparency (i.e., transparent side), and the letters are displayed lightly and translucently. At this time, the volume of the sound of the message is also set to a low level.

Although not illustrated, in a case the player object 82 is further separated from the message generating object 84 until the distance between them exceeds a predetermined value, the transparency of the texture of the letters is set to be transparent, and the message by the letters is not displayed on the display screen.

Thus, the form (transparency in this embodiment) of the texture of the letters 86 is changed depending upon the distance between the player object 82 and the message generating object 84. Accordingly, it is possible to further improve realism to be created by a three-dimensional game image, a sound and etc. Furthermore, in this case, the light and dark of the letters is also changed, and therefore, it is possible to intuitively determine how far it is from the message generating object, and it is possible to enhance stage effects at a time of appearance of the message generating object 84 during playing the game and to further improve strategies and interest in the game.

Figure 5:
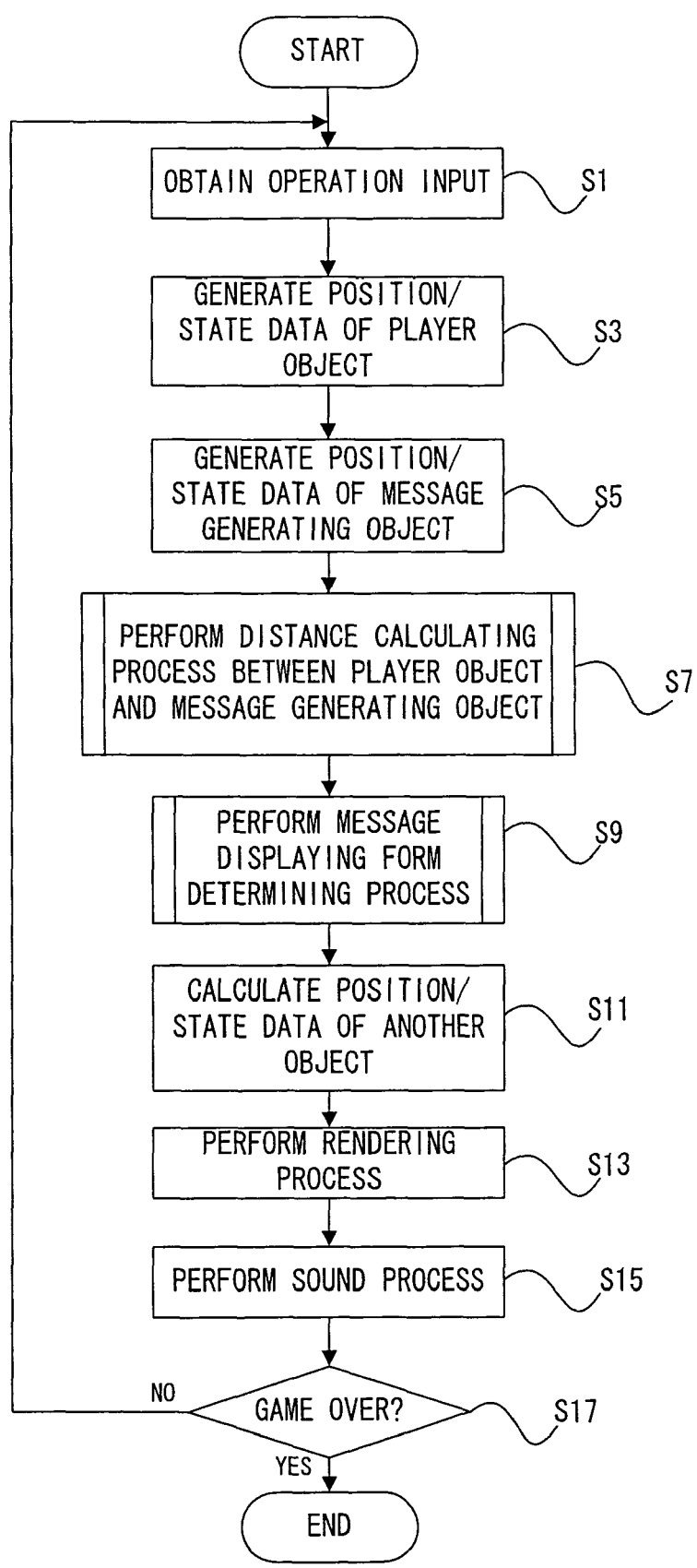
FIG. 5 is a flowchart showing one example of an operation of the game machine in FIG. 1 embodiment.

A game operation of the game machine 12 is shown in FIG. 5. It is noted that when playing the game, the player sets the optical disk 18 in the game machine 12 described above and turns the power source on. Thereupon, a program and data are read from the optical disk 18 such that a program and data required are loaded into the main memory 40 similarly to FIG. 3, and the CPU 36 executes a process according to the program.

In a step Si in FIG. 5, the CPU 36 obtains an operation input signal from the controller 22 via the controller I/F 56 and the memory controller 38. In a next step S3, in response to the operation input signal, position data and state data of the player object 82 in a world coordinate are generated (renewed). For example, in a case the game player operates a direction instructing means (e.g., cross key or analog joystick) of the controller 22, the CPU 36 moves the player object 82 toward the direction in the game space in this step S3.

In a following step S5, the CPU 36 generates (renews) position data and state data of the message generating object 84. In a case the message generating object 84 is a movable character, the moved position data is calculated.

Then, in a step S7, the CPU 36 executes a distance calculating process between the player object and the message generating object. Specifically, the distance calculating process is shown in FIG. 6 in detail.

Figure 6:
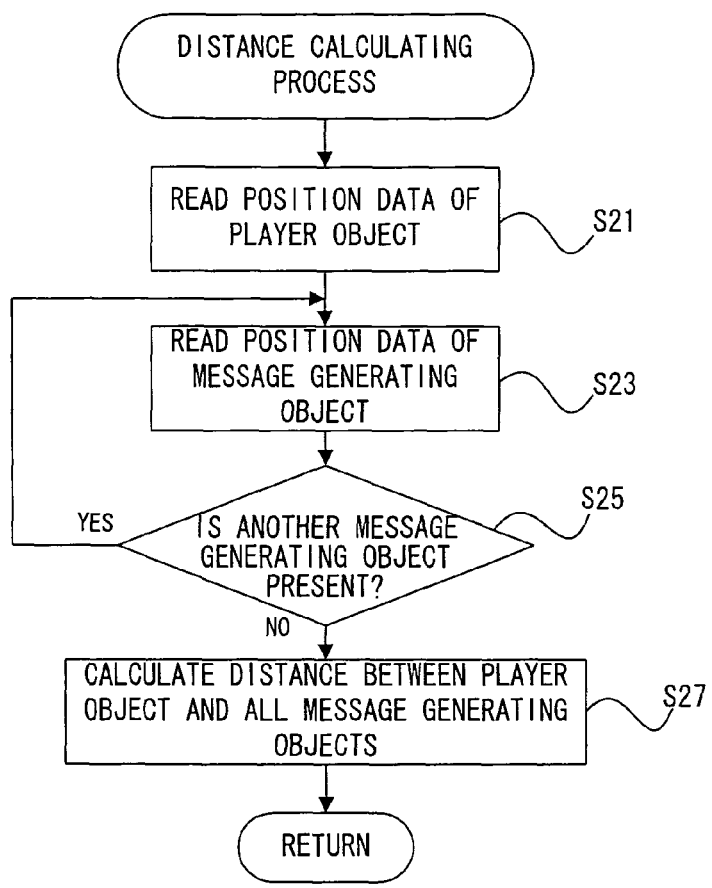
FIG. 6 is a flowchart showing one example of an operation of a distance calculating process in FIG. 5.

In a first step S21 in FIG. 6, the CPU 36 reads the position data of the player object 82 from a predetermined area of the main memory 40. Then, in a step S23, the CPU 36 reads the position data of the message generating object 84 from a predetermined area of the main memory 40. In a following step S25, the CPU 36 determines whether or not another message generating object is present, and if "YES" in the step S25, the process is returned to the step S23 so as to be repeated. Accordingly, the position data of all message generating objects are read.

If "NO" in the step S25, that is, if the message generating object to be read is not present, the process proceeds to a step S27 so as to calculate distances between the player object 82 and all message generating objects. After completion of the process in the step S27, the process returns to the main flowchart shown in FIG. 5.

Next, the CPU 36 executes a message displaying form determining process in a step S9 in FIG. 5. The message displaying form determining process changes a form of the texture of the letters of the message and is described in detail in FIG. 7.

Figure 7:
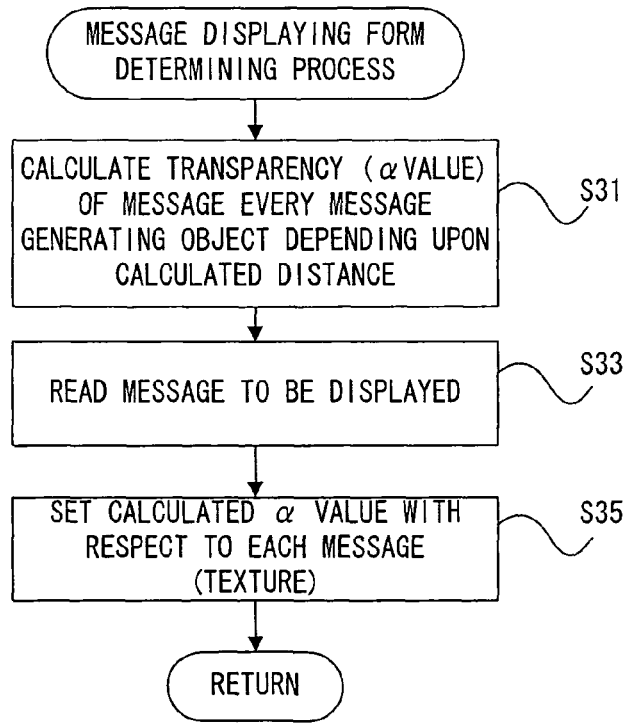
FIG. 7 is a flowchart showing one example of an operation of a message displaying form determining process in FIG. 5.

In a first step S31 in FIG. 7, the CPU 36 calculates or determines the transparency (α value) of the message formed by the letters every message generating object depending upon the calculated distance between the player object 82 and message generating object.

Figure 8:
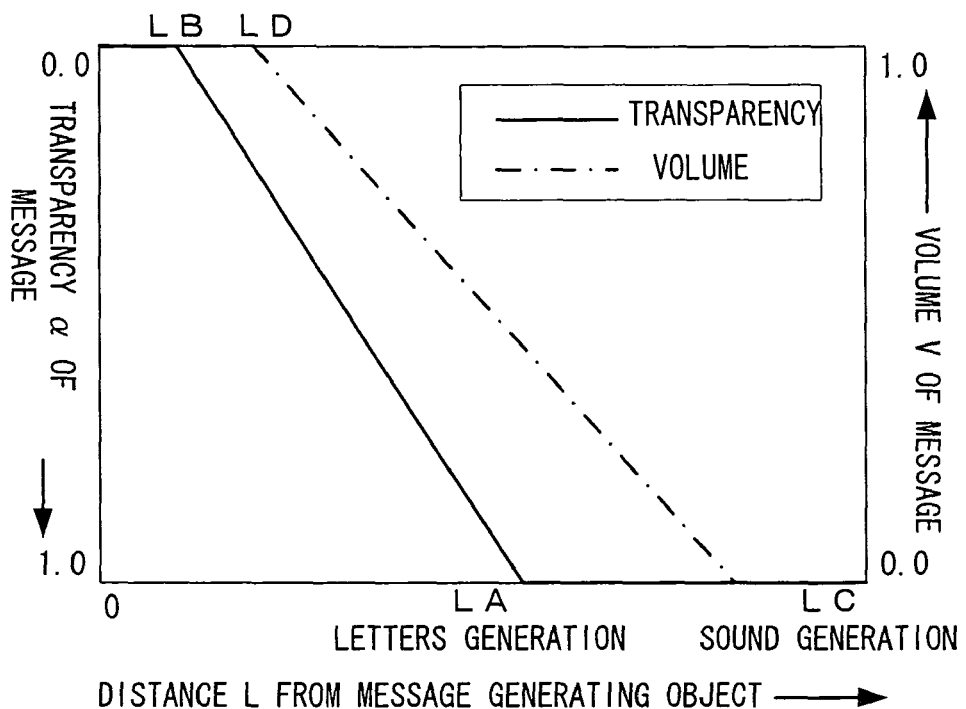
FIG. 8 is an illustrative view showing one example of a relationship between transparency of letters of a message, volume and distance.

Herein, one example of a relationship between the transparency α of the message formed by the letters and a distance L between the player object and the message generating object is shown. In FIG. 8, a longitudinal axis on the left side indicates the transparency (α value) of the message in a downward direction (i.e., opacity in an upward direction), and a horizontal axis on the lower side is α=1.0 (maximum value) and is equal to full transparency while a horizontal axis on the upper side is α=0.0 (minimum value) and is equal to full opacity. The horizontal axis also means the distance L between the player object and the message generating object. Furthermore, in FIG. 8, a relationship between a volume V of the message by the sound and the distance L is also shown. A longitudinal axis on the right side indicates the volume of the message by the sound, the horizontal axis on the lower side is V=0.0 and is equal to silence, and the horizontal axis on the upper side is V=1.0 and is equal to a standard volume, for example, set for the message. Then, the transparency is shown by a solid line, and the volume is shown by a one-dotted line.

According to FIG. 8, the transparency α is set to 1.0 when the distance L is more than a predetermined value LA. That is, this means that the message by the letters is not displayed when the player object is far from the message generating object by the predetermined distance LA and more. Then, if the distance L is shorter than the predetermined value LA, that is, if the player object exists within the range of the predetermined distance LA from the message generating object, the message by the letters appears on the display screen and is displayed in a translucent manner. The predetermined distance LA is a threshold value of the distance L for generating the message by the letters.

Furthermore, the transparency α is set so as to be linearly proportional to the distance L in this embodiment. That is, the longer the distance L is, the greater the transparency is. On the contrary thereto, the shorter the distance L is, the greater the opacity is. Accordingly, the message by the letters is displayed dark in color as the player object is closer to the message generating object and displayed light in color as the player object is far from the message generating object. Then, when the distance L is equal to or less than a predetermined distance LB, the transparency α is set to 0.0. That is, when the player object exists within the range of the predetermined distance LB from the message generating object, the message by the letters is displayed full-opaquely or vividly.

Furthermore, as understood from FIG. 8, the volume V of the message by the sound is set so as to be changeable depending upon the distances L. More specifically, when the player object is far from the message generating object by a predetermined distance LC and more, the sound of the message is not output, and when the player object exists within the range of the predetermined distance LC from the message generating object, the sound of the message is output. That is, the distance LC is a threshold value of the distance L for generating the sound. Then, the volume is inversely proportional to the distance and becomes loud as the player object is close to the message generating object. Then, when the player object exists within the range of a predetermined distance LD from the message generating object, the message by the sound is output at a constant volume set.

In addition, as understood from FIG. 8, the relationship between the transparency α of the texture of the letters and the distance L is set so as to become different from the relationship between the volume V of the sound and the distance L. More specifically, the threshold value LA of the distance for generating the letters and the threshold value LC of the distance for generating the sound are set so as to be different from each other. That is, a letters generating timing and a sound generating timing are different from each other. In this example, the letters generating threshold value LA is larger than the sound generating threshold value LC, and therefore, in a case the player object is close to the message generating object, for example, the sound of the message first starts to be heard and then, the letters starts to be displayed after further being close to the message generating object. Furthermore, a ratio of changes of the transparency of the letters and a ratio of changes of the volume are set so as to become different from each other. In addition, the distance LB in which the transparency of the letters converges to 0.0 (i.e., opaque) and the distance LD in which the volume converges to a setting value are set so as to become different from each other, that is, converging timings of changes are different between the letters and the sound.

Thus, if the relationship between the transparency of the letters and the distance and the relationship between the volume of the sound and the distance are different from each other, it is possible to represent perspective based on different characteristics and roles between the sound and the letters. Accordingly, it is possible to further enhance realism and improve interest. For example, the sound is transmitted in the air and thus may be set so as to be heard a relatively long way off. On the other hand, the letters are symbols which are written and fixed on the object and probably play a role at close range, and thus can be set to be displayed after being closer to the message generating object. Furthermore, in a case the message generating object is the above-described radio tower in the park shown in FIG. 4, the sound is probably set to be heard and displayed a relatively long way off so as to be transmitted to an overall settlement in that area. In addition, in a case the sound is utilized as a signal for attracting player's attention or in a case an important message is generated, the sound can be set to be heard a long way off (as far as an end of the area) while the letters can be displayed so as not to be viewed without being closer to the radio tower.

It is noted that the relationship between the transparency α and the distance L and the relationship between the transparency α and the volume V are not limited to the relationships shown in FIG. 8 and can be changed as desired.

Figure 9:
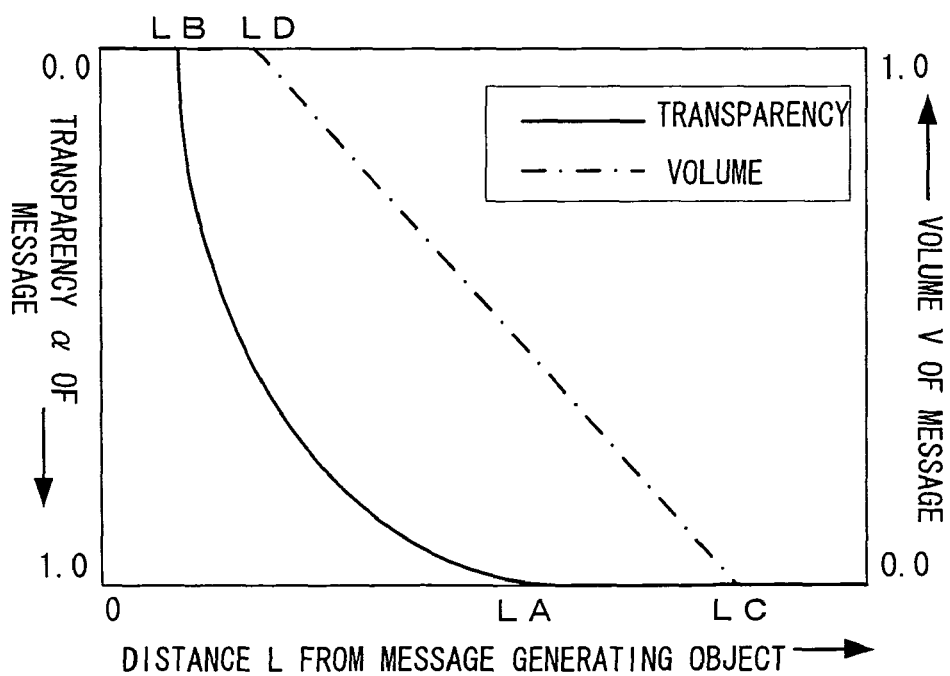
FIG. 9 is an illustrative view showing another example of the relationship between transparency of letters of a message, volume and distance.

In FIG. 8 example, the transparency α is changed so as to be linearly proportional to the distance L; however, a manner of changes of the transparency α is adequately changeable, and the transparency α may be changed so as to be exponentially proportional to the distance L as shown in FIG. 9. In this case, when the player object enters the area of the letters generating threshold value LA and is close to the message generating object, the letters can be gradually dark and then, after being close to the message generating objects to some extent, the letters can be sharply dark. Accordingly, it is possible to enhance realism and improve interest.

Furthermore, in each of the above-described examples, the transparency α is successively changed with respect to the distance L, but may be changed in stages every predetermined distance area, for example.

In addition, as to the relationship between the transparency α and the volume V, the letters generating timing (generating threshold value LA) and the sound generating timing (generating threshold value LC) may be set to the same, or the change converging timings (LB and LD) may be set to the same, for example. Also, the volume V may be made constant within the sound generating range so as not to be changed depending upon the distance L.

In a step S31 shown in FIG. 7, the transparency α is determined on the basis of the above-described relationships. Succeedingly, the CPU 36 reads a message to be displayed in a step S33. More specifically, the texture data of the message to be displayed of all the message generating objects to be displayed are read from the storing area 74d to a predetermined area. It is noted that the message generating object to be displayed is selectable by determining whether or not the player object exists within the area of the letters generating threshold value LA (letters generating range) every message generating object. Then, the message to be displayed at this time is determined on the basis of the message data 72c of the data storing area 72.

It is noted that in a case that the message formed by the letters is scroll-displayed, a reading position of the texture is successively advanced toward the end of the sentence every predetermined number of frames, for example. Furthermore, in a case of scroll-displaying the letters and the sound of the message is a sound accurately representing the message as it is, it is desirable that the reading position of the texture is determined such that a display position or a display area of the message formed by the letters and a reproducing position of the sound of the message are coincident with each other.

Then, in a step S35, the CPU 36 sets the calculated transparency (α value) with respect to the texture data of each of the read messages. Thus, an α channel of each pixel of the read texture data is renewed on the basis of the calculated transparency. After completion of the process in the step S35, the process returns to the main flowchart shown in FIG. 5.

The CPU 36 further calculates (renews) the position data and the state data of another object in a step S11 shown in FIG. 5.

Then, the CPU 36 executes a rendering process by use of the GPU 42 in a step S13. More specifically, first, a position of the virtual camera in the world coordinate is renewed depending upon a renewed position of the player object. Furthermore, a position of the billboard is also renewed corresponding thereto. Then, positions of the player object, the message generating object, the background object and etc. are converted into a three-dimensional camera coordinate system with reference to the virtual camera, and then, three-dimensional camera coordinate system is converted into a two-dimensional projection plane coordinate system. Then, the textures of the player object, the message generating object, another object and etc. are read from the texture data storing area 74 shown in FIG. 3 and are mapped on each of the objects, the billboard and so on. Furthermore, if the message to be displayed is present, that is, if the player object is within the above-described character generating area, the texture of the message generated in the step S35 (FIG. 7) in a message displaying form determining process in the step S9 is also read so as to be mapped on the billboard. The billboard can be pasted with the background texture such as the distant view and etc. on which the texture of the message is superimposed by an alpha blend (a combining process). That is, color information of the texture of the message and color information of the texture except for the message to be pasted on the billboard are mixed at a ratio depending upon the transparency in each of the pixels at the rendering position. Thus, rendered image data is rendered in the frame buffer 48.

In a case a plurality of messages to be displayed are present, displaying positions of the respective messages are adjusted so as not to be superimposed with each other. Furthermore, a plurality of billboards may be used.

Accordingly, through the rendering process in the step S13, game images (display screen) 80 shown in FIG. 4 (A) and FIG. 4 (B), for example, on which an operation obtained in the step Si is reflected and on which messages to be displayed are represented by a predetermined form are displayed on the monitor 34.

Succeedingly, the CPU 36 executes a sound process by use of the DSP 52 in a step S15, and whereby, a game BGM, a sound effect, a message sound and etc. are output from the speakers 34a. In the step S15, it is determined whether or not the message by the sound is to be output on the basis of the distance calculated in the step S7, and if the player object exists within the sound generating range as described above, the sound data 76a of the message sound is also processed so as to be output.

Then, the CPU 36 determines whether or not the game is over in a step S17. If the game is not over, the process is returned to the first step Si so as to repeat the processes while if the game is over, a process for ending the game is executed so as to end the game.

It is noted that although the transparency of the texture of the message is changed depending upon the distance between the player object and the message generating object in the above-described embodiment, the form of the letters to be changed is not limited to the transparency. For example, similarly to another embodiment shown in FIG. 10, a size of the letters of the message may be changed.

Figure 10:
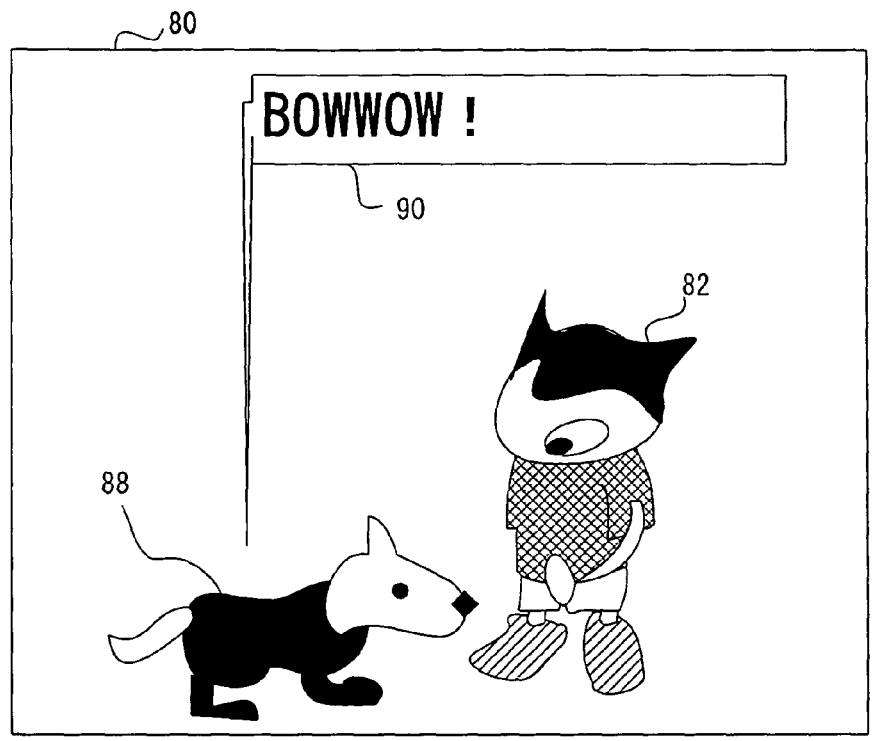
FIG. 10 (A) illustrates another example of a display screen when a player object and a message generating object are close to each other, and FIG. 10 (B) illustrates another example of the display screen when the player object and the message generating object are far from each other.
Figure 10:
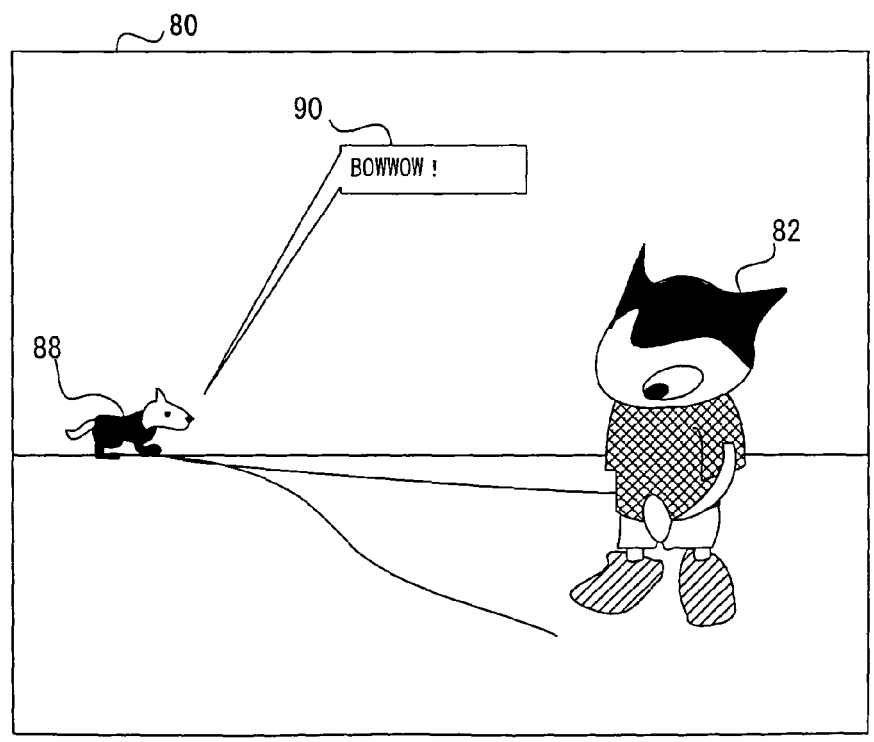

A dog character 88 is displayed as one example of the message generating object on a display screen 80 shown in FIG. 10. A message (bow-wow! in this embodiment) 90 by the letters is displayed on the display screen 80. It is noted that the message is displayed in a balloon (line displaying frame) of the message generating object 88 in this embodiment.

In FIG. 10 (A), the distance between the player object 82 and the message generating object 88 are short, and therefore, the texture of the letters 90 is largely displayed by enlargement and etc. Then, in a case the player moves the player object 82 far from the message generating object 88 by operating the controller 22, the longer the distance is, the smaller the size of the letters is. In FIG. 10 (B), the distance between the player object 82 and the message generating object 88 is long, and therefore, the texture of the letters 90 is displayed small by reduction and etc. It is noted that it is appropriate that either the enlargement or the reduction is performed depending upon an initial size of the letters of the message texture.

Figure 11:
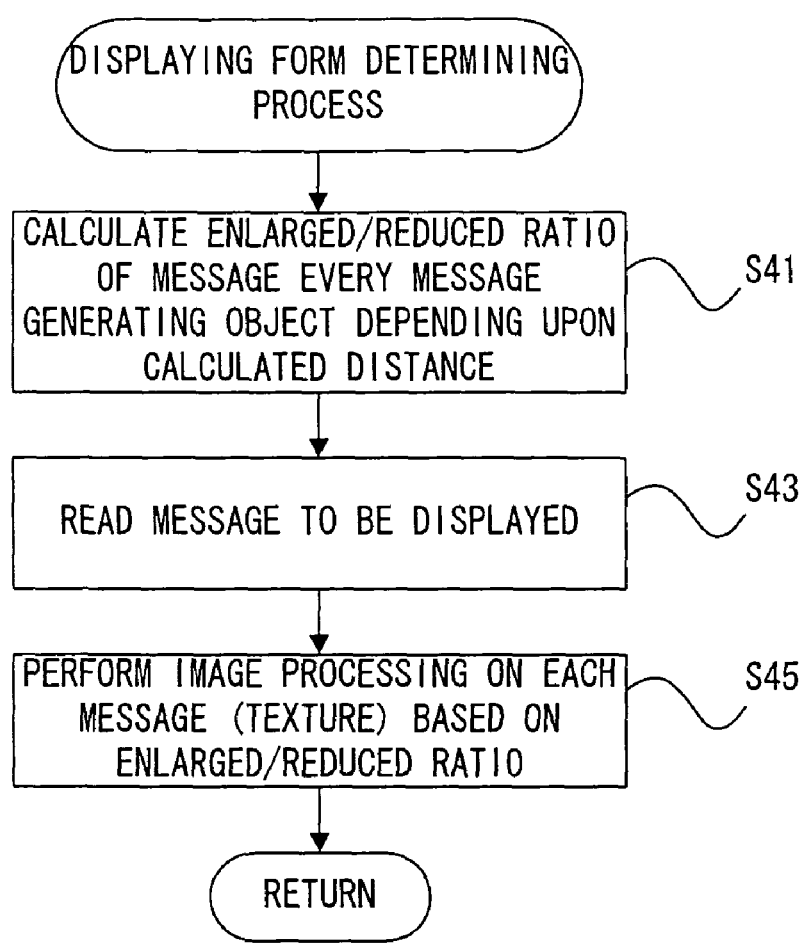
FIG. 11 is a flowchart showing another example of the operation of the message displaying form determining process in FIG. 5.

The message displaying form determining process (step S9 in FIG. 5) in another embodiment is shown in detain in FIG. 11. In a first step S41 in FIG. 11, the CPU 36 calculates or determines an enlarged/reduced ratio of the message texture by the letters every message generating object depending upon the distance between the player object and the message generating object calculated in the step S7 in FIG. 5. It is noted that a relationship between the enlarged/reduced ratio of the message and the distance is adequately set similarly to various examples (e.g., FIG. 8 or FIG. 9) in the above-described transparency case.

Next, the CPU 36 reads the message to be displayed in a step S43, and succeedingly, the texture data of each message read is subjected to an image processing on the basis of the calculated enlarged/reduced ratio in a step S45. Thus, the texture data on which enlargement/reduction is performed is generated and written in a predetermined area of the main memory 40. It is noted that the calculated enlarged/reduced ratio and the read texture data are corresponded with each other in the step S45, and the image processing may be performed in the rendering process in the step S13 shown in FIG. 5.

Accordingly, by the rendering process in the step S13 in the main flowchart shown in FIG. 5, the display screen 80 (e.g., FIG. 10 (A) or FIG. 10 (B)) displayed with the letters on which the enlargement/reduction is performed depending upon the distance within the letters generating range is displayed on the monitor 34.

According to another embodiment, the size of the letters is changed depending upon the distance between the player object and the message generating object and therefore, it is possible to intuitively determine how far it is and hence, it is possible to enhance realism and improve strategies and interest as a game.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus which displays letters, representative of a sound generated by a speech generating object, using a virtual billboard, comprising:
    a distance calculator to calculate a distance between said speech generating object and a player object; and
    form changing programmed logic circuitry to change a form of said letters to be displayed on said billboard depending upon said distance calculated by said distance calculator such that said letters are illegible at or beyond a predetermined distance threshold and the letters approach legibility as the distance is decreased from the predetermined distance threshold.

2. A game apparatus according to claim 1, wherein said form changing programmed logic circuitry changes transparency of said letters based on said distance.

3. A game apparatus according to claim 2, wherein said form changing programmed logic circuitry increases the transparency of said letters in proportion to said distance calculated by said distance calculator.

4. A game apparatus according to claim 1, wherein said form changing programmed logic circuitry changes a size of said letters.

5. A game apparatus according to claim 1, wherein said form changing programmed logic circuitry changes the form of said letters such that a relationship between the form of said letters and the distance is different from a relationship between said sound and the distance.

6. A game apparatus according to claim 5, wherein in the relationship between the form of said letters and the distance, the predetermined distance threshold is different from a threshold value of a distance for generating said sound.

7. A game apparatus according to claim 1, further comprising volume changing programmed logic circuitry to change a volume of said sound generated by said speech generating object in accordance with said distance calculated by said distance calculating programmed logic circuitry.

8. A game message displaying method in a game apparatus which displays letters, representative of a sound generated by a speech generating object, using a virtual billboard, said method comprising the steps of:
   calculating a distance between said speech generating object and a player object; and
   changing a form of said letters to be displayed on said billboard depending upon said distance calculated, such that said letters are illegible at or beyond a predetermined distance threshold and the letters approach legibility as the distance is decreased from the predetermined distance threshold.

9. A game message displaying method according to claim 8, wherein changing said form includes changing a transparency of said letters.

10. A game message displaying method according to claim 9, wherein the transparency of said letters is increased in proportion to said distance calculated.

11. A game message displaying method according to claim 8, wherein changing said form includes changing a size of said letters.

12. A game message displaying method according to claim 8, wherein a relationship between the form of said letters and the distance is different from a relationship between said sound and the distance.

13. A game message displaying method according to claim 12, wherein in the relationship between the form of said letters and the distance, the predetermined distance threshold is different from a threshold value of a distance for generating said sound.

14. A game message displaying method according to claim 8, further comprising changing a volume of said sound generated by said speech generating object in accordance with said distance calculated by said calculating.

15. An electronic storage medium storing a program executable on a computer to display a game message in a game apparatus which displays letters, representative of a sound generated by a speech generating object, using a virtual billboard, said program causing a processor of said game apparatus to execute the steps of:
   calculating a distance between said speech generating object and a player object; and
   changing a form of said letters to be displayed on said billboard depending upon said distance calculated such that said letters are illegible at or beyond a predetermined distance threshold and the letters approach legibility as the distance is decreased from the predetermined distance threshold.

16. An electronic storage medium storing a game message displaying program according to claim 15, wherein changing said form includes changing the transparency of said letters.

17. An electronic storage medium storing a game message displaying program according to claim 16, wherein the transparency of said letters is increased in proportion to said distance calculated.

18. An electronic storage medium storing a game message displaying program according to claim 15, wherein changing said form includes changing a size of said letters.

19. An electronic storage medium storing a game message displaying program according to claim 15, wherein a relationship between the form of said letters and the distance is different from a relationship between said sound and the distance.

20. An electronic storage medium storing a game message displaying program according to claim 19, wherein in the relationship between the form of said letters and the distance, the predetermined distance threshold is different from a threshold value of the distance for generating said sound.

* * * * *